UNITED STATES PATENT OFFICE.

JAMES B. HODGSKIN, OF NEW YORK, N. Y.

IMPROVED PAINT.

Specification forming part of Letters Patent No. 51,317, dated December 5, 1865.

*To all whom it may concern:*

Be it known that I, JAMES B. HODGSKIN, of the city, county, and State of New York, have invented an Improved Paint, of which the following is a specification.

The object of my invention is the production of a paint which shall surpass in durability and power to resist heat, dampness, &c., the paints in ordinary use; and it consists of a water and weather proof paint made by combining pigments of any desired colors with the composition invented by Jonathan H. Green and described in the Letters Patent of the United States granted to James B. Hodgskin the 30th day of June, A. D. 1863, for an improved water-proof varnish for paper, cloth, &c.

The pigments, properly prepared, are mixed with the above composition in a proportion proper to produce paint of the ordinary consistency, which may be reduced by the addition of a greater quantity of benzine, if desired. By reducing the quantity of benzine the consistency of the paint will be increased.

The paint, being properly mixed ready for use, may be applied in the usual manner by means of a brush and allowed to dry and season in the ordinary way, or it may be dried more rapidly by the application of heat, if preferred.

The paint thus produced is extremely durable, and is capable of resisting the action of heat, water, or wear occasioned by friction, as on painted floors, for instance. It is very valuable for painting the outside of buildings, shipping, and other articles exposed to the weather, the bottom and sides of boats, or in any instance where it is desired to protect articles from the action of water or the heat of the sun. That portion of the inside work of buildings exposed to the heat of stoves, furnaces, &c., may be effectually protected from blistering by the application of this paint, as no ordinary amount of heat will affect it disadvantageously.

Having thus fully described my invention, its advantages and uses, I claim—

As a new article of manufacture, the paint made, as described, by the combination of pigments with the composition hereinbefore mentioned.

JAS. B. HODGSKIN.

Witnesses:
    THOS. P. HOW,
    WILLIAM K. EVANS.